Figure 1:
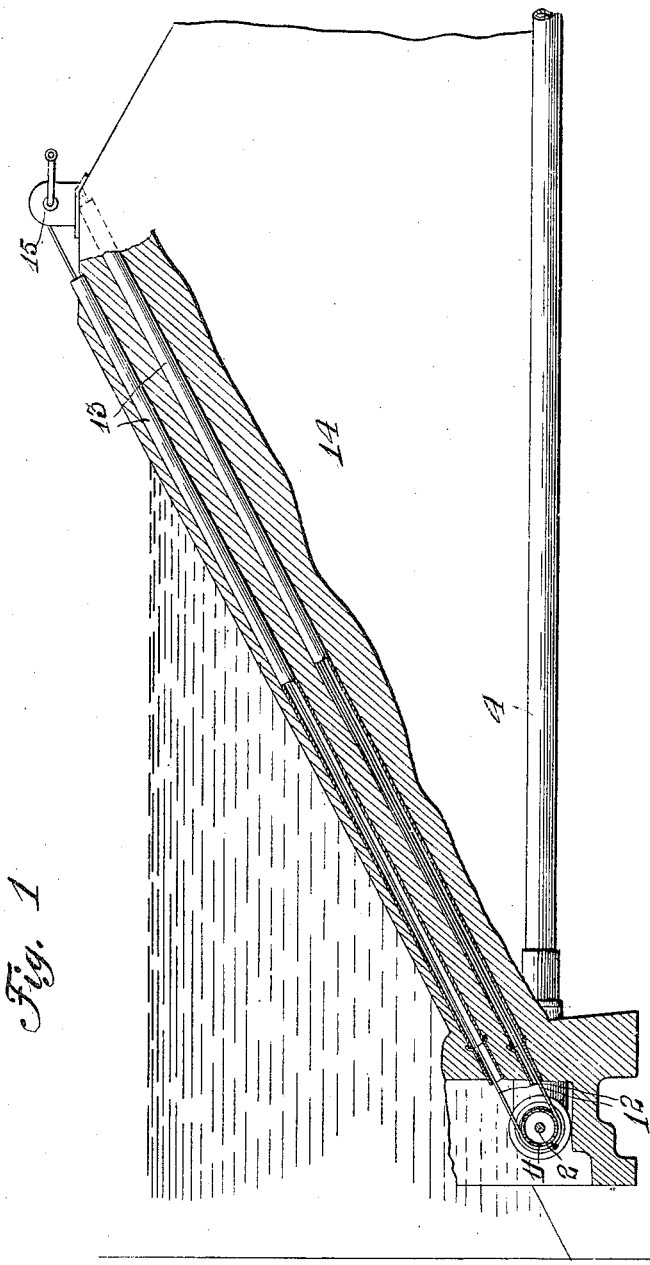

J. N. GILBERT.
GATE VALVE.
APPLICATION FILED MAR. 19, 1910.

971,673.

Patented Oct. 4, 1910.
2 SHEETS—SHEET 1.

WITNESSES
Morris Lessiw
B. Y. Richards

INVENTOR
Joseph N Gilbert

By Joshua R. H. Potts
His Attorney

J. N. GILBERT.
GATE VALVE.
APPLICATION FILED MAR. 19, 1910.
971,673.
Patented Oct. 4, 1910.
2 SHEETS—SHEET 2.
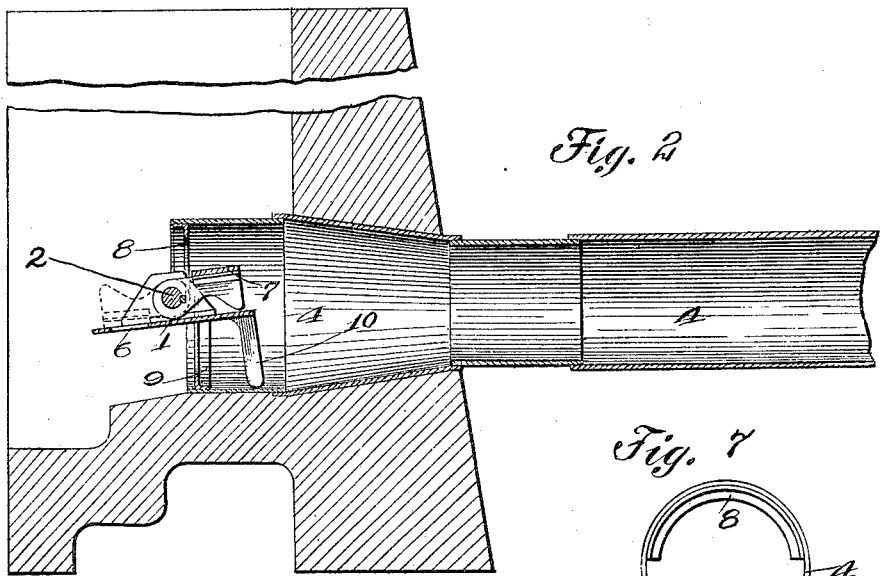
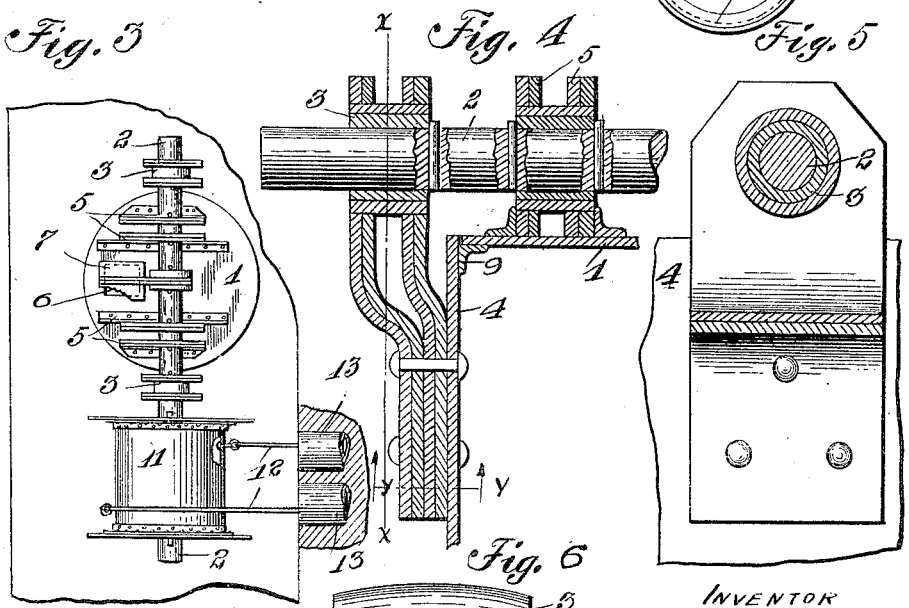
INVENTOR
Joseph N. Gilbert
WITNESSES

UNITED STATES PATENT OFFICE.

JOSEPH N. GILBERT, OF CHICAGO, ILLINOIS.

GATE-VALVE.

971,673.   Specification of Letters Patent.   Patented Oct. 4, 1910.

Application filed March 19, 1910. Serial No. 550,323.

*To all whom it may concern:*

Be it known that I, JOSEPH N. GILBERT, a citizen of the United States, residing at Chicago, county of Cook, and State of Illinois, have invented certain new and useful Improvements in Gate-Valves, of which the following is a specification.

My invention relates to improvements in gate valves and has for its object the production of a gate valve which shall be comparatively easy to open and close and which shall be of simple construction and efficient in its operation.

The invention consists in the combination and arrangement of parts hereinafter described and claimed.

The invention will be best understood by reference to the accompanying drawings forming a part of this specification, and in which, Figure 1 is a sectional elevation illustrating my improved construction as applied to an emergency valve for reservoirs, Fig. 2 is an enlarged vertical section through the valve and discharge pipe, Fig. 3 is a top plan view of the valve with the discharge pipe removed, Fig. 4 is an enlarged detail section illustrating the mounting of the valve, Fig. 5 is a section on line $x$—$x$ of Fig. 4, Fig. 6 is a section on line $y$—$y$ of Fig. 4, and Fig. 7 is an elevation of the mouth of the discharge pipe.

The preferred form of construction as illustrated in the drawings comprises a disk 1 loosely mounted on a shaft 2 rotatable in bearings 3 secured to either side of the mouth of the discharge pipe 4. The disk 1 is supported on shaft 2 by means of hangers 5 secured to the face of said disk and carrying bearings for said shaft. As shown the shaft 2 is located slightly above the horizontal diameter of disk 1 so that the area of disk 1 lying below the axis of said shaft is greater than the area of the portion of said disk lying above said axis. An auxiliary valve opening 6 is provided in the lower portion of disk 1 and is of such an area that, subtracted from the said larger portion, renders the effective remainder of said larger portion less than the smaller portion. An auxiliary valve 7 is keyed to shaft 2 and is adapted to close or open said auxiliary valve opening 6 when swung to or away from contact with the lower portion of disk 1. Annular angle irons 8 and 9 are secured within the mouth of discharge pipe 4 as indicated in Figs. 2 and 7 and serve to engage the upper and lower edges of disk 1 to act as stops to hold said valve disk in closed position. A projection 10 carried by the upper end of disk 1 is arranged to contact with the bottom of discharge pipe 4 to limit the opening movement of disk 1 and to maintain said disk in a slightly inclined position as shown in Fig. 2. At one end shaft 2 carries a drum 11 to which are attached the ends of a cable 12 passing upwardly through conduits 13 embedded in the dam 14 and leading to a windlass 15 located on the top of the dam and by means of which said cable may be operated to rotate shaft 2.

In operation, when disk 1 is in closed position with auxiliary valve 7 closing auxiliary valve opening 6 the effective pressure on the lower portion of said disk is greater than that upon the upper and said disk is held to closed position against stops 8 and 9 by the excess pressure on the lower portion of said disk. When it is desired to open the valve the windlass 15 is operated to rotate shaft 2 to swing auxiliary valve 7 away from auxiliary valve opening 6. This permits the escape of water through opening 6 and renders the effective area of the lower portion of the disk less than that of the upper portion thereof so that said disk will be automatically swung to and held in open position by this unbalanced pressure. When it is desired to close said disk, the shaft 2 is rotated to bring auxiliary valve 7 over opening 6, whereupon the effective area of the lower portion of the disk exceeds that of the upper portion and the disk will be swung to closed position by the unbalanced pressure on the lower portion thereof. Thus it will be observed that the only exertion necessary to open or close the valve consists in that which is necessary to open or close the auxiliary valve, whereupon the unbalanced pressures produced thereby automatically effect the desired movements of the valve.

While I have illustrated and described the preferred form of construction for carrying my invention into effect this is capable of variation and modification without departing from the spirit of the invention. I therefore do not wish to be limited to the exact details of construction set forth but desire to avail myself of such variations and modifications as come within the scope of the appended claims.

Having described my invention what I claim as new and desire to secure by Letters Patent is:

1. In a device of the class described, the combination of a valve member pivoted to swing to open or closed position on a pivot whose axis is offset from the center of the area of said valve member, the larger portion of said valve member being provided with an auxiliary valve opening of such an area that, substracted from the said larger portion, renders the effective remainder of said larger portion less than the smaller portion; an auxiliary valve adapted to open and close said opening; and means for operating said auxiliary valve, substantially as described.

2. In a device of the class described, the combination of a valve member pivoted to swing to open or closed position on a pivot whose axis is offset from the center of the area of said valve member, the larger portion of said valve member being provided with an auxiliary valve opening of such an area that, substracted from the said larger portion, renders the effective remainder of said larger portion less than the smaller portion, stops for limiting the swing of said valve member at open and closed position; an auxiliary valve adapted to open and close said opening; and means for operating said auxiliary valve, substantially as described.

3. In a device of the class described, the combination with a pipe, of a valve disk pivoted in said pipe above its center; a stop for limiting the movement of said valve disk at closed position; an auxiliary valve in the lower portion of said disk; and means for opening and closing said auxiliary valve, substantially as described.

4. In a device of the class described, the combination with a pipe, of a valve disk pivoted in said pipe above its center; stops for limiting the movements of said valve disk at open and closed positions; an auxiliary valve in the lower portion of said disk; and means for opening and closing said auxiliary valve, substantially as described.

5. In a device of the class described, the combination with a reservoir dam of a discharge pipe passing through the lower portion thereof; a valve disk pivoted in the mouth of said pipe above its center and provided with an auxiliary valve opening in its lower portion; an auxiliary valve fixed to said disk pivot and adapted to close said opening; means for rotating said pivot; and stops for limiting the opening and closing movements of said disk, substantially as described.

6. In a device of the class described, the combination with a reservoir dam of a discharge pipe passing through the lower portion thereof; a valve disk pivoted in the mouth of said pipe above its center and provided with an auxiliary valve opening in its lower portion; an auxiliary valve fixed to said disk pivot and adapted to close said opening; a windlass at the top of said dam; a cable connecting said windlass with said pivot; annular angle irons secured to the interior of said pipe and arranged to stop said disk in closed position; and a projection carried by said disk and adapted to contact with the bottom of said pipe to stop said disk in open position, substantially as described.

In testimony whereof I have signed my name to this specification in the presence of two subscribing witnesses.

JOSEPH N. GILBERT.

Witnesses:
 HELEN F. LILLIS,
 JOSHUA R. H. POTTS.